United States Patent
Leung

(10) Patent No.: US 7,099,332 B2
(45) Date of Patent: Aug. 29, 2006

(54) EMERGENCY CALLING WITH A VOIP DEVICE IN A VLAN ENVIRONMENT

(75) Inventor: Mun Keung Leung, Redwood City, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 561 days.

(21) Appl. No.: 09/752,004

(22) Filed: Dec. 29, 2000

(65) Prior Publication Data

US 2002/0085538 A1    Jul. 4, 2002

(51) Int. Cl.
*H04L 12/28* (2006.01)
*H04M 11/04* (2006.01)

(52) U.S. Cl. .............. 370/395.42; 370/230; 370/412; 379/45

(58) Field of Classification Search ........ 370/351–352, 370/338, 349, 395.52, 230, 395.53, 395–53, 370/461–462, 412–418, 395.2; 379/37–50
See application file for complete search history.

(56) References Cited

U.S. PATENT DOCUMENTS

| | | | | |
|---|---|---|---|---|
| 5,805,670 | A | * | 9/1998 | Pons et al. ............... 379/45 |
| 6,167,445 | A | * | 12/2000 | Gai et al. ................ 709/223 |
| 6,201,856 | B1 | * | 3/2001 | Orwick et al. ............ 379/40 |
| 6,466,651 | B1 | * | 10/2002 | Dailey .................... 379/37 |
| 6,625,119 | B1 | * | 9/2003 | Schuster et al. ........... 370/230 |
| 6,650,619 | B1 | * | 11/2003 | Schuster et al. ........... 370/230 |
| 6,711,247 | B1 | * | 3/2004 | Needham et al. ........ 379/207.14 |
| 6,788,781 | B1 | * | 9/2004 | Shtivelman ............. 379/309 |
| 2002/0054670 | A1 | * | 5/2002 | Shtivelman ............ 379/88.16 |
| 2004/0076161 | A1 | * | 4/2004 | Lavian et al. .......... 370/395.41 |

* cited by examiner

*Primary Examiner*—Chi Pham
*Assistant Examiner*—Tri H. Phan

(57) ABSTRACT

Method (130) for optimizing emergency call service in a Virtual Local Area Network including at least one Voice over Internet Protocol device. A range of port numbers is reserved for use during emergencies (134). Next, a VoIP device transmits an emergency call within the VLAN using a port in the specified range (136). Extra resources are reserved for handling the calls using ports within the specified range (138).

14 Claims, 10 Drawing Sheets ns network.

EMERGENCY CALLING WITH A VOIP DEVICE IN A VLAN ENVIRONMENT

TECHNICAL FIELD

The invention relates in general to telecommunication networks and related applications and, in particular, to a method and system of modifying resources of data packets in a VLAN environment. More particularly, the invention relates to optimizing emergency call service in a Voice over Internet Protocol (VoIP) device operating in a VLAN-aware communications network.

BACKGROUND OF THE INVENTION

Without limiting the scope of the invention, its background is described in connection with modifying VoIP networks for communicating voice data over a data network.

The transmission of analog voice over the Public Switch Telephone Network (PSTN) is slowly being supplemented by other technologies, such as VoIP. The immediate goal for VoIP service providers is to reproduce existing PSTN capabilities at a significantly lower "total cost of operation" and to offer technically competitive alternatives to the PSTN. It is the combination of VoIP with point of service applications that shows the greatest promise for the long term. VoIP provides a competitive threat to the providers of traditional telephone services that, at the very least, will stimulate improvements in cost and function throughout the industry.

Essentially, VoIP may be applied to almost any voice application including simple inter-office intercom to complex multi-point teleconferencing and shared screen environments. The quality of voice reproduction may also be tailored according to the application. For example, customer calls utilizing voice recognition may need to be of higher quality than internal paging over an overhead paging system. Hence, VoIP equipment must have the flexibility to cater to a wide range of configurations and environments and an ability to blend traditional telephony standards with VoIP.

Despite initial excitement among consumers for VoIP services, customers are worried over possible degradation in voice quality due to packetization of voice into voice packets. Whether these concerns are based on experience with early Internet telephony applications or whether they are based on understanding the nature of packet networks, voice quality is a crucial parameter in acceptance of VoIP services.

In addition, VoIP services need to be able to connect to traditional circuit switch voice networks. The International Telecommunications Union (ITU) has addressed this goal by defining H.323, a set of standards for packet-based multimedia networks. With H.323, the network is able to connect with other H.323 terminals or more traditional phone services such as PSTN, ISDN, or wireless phones. H.323 describes how multimedia communications occur between terminals, network equipment, and services on Virtual Local Area Network (VLANS) which often do not provide a guaranteed quality of service. Due to the support of personal computer, communication systems manufacturers and operating systems makers, H.323 has experienced rapid growth. H.323 compliance has been promoted and accepted by Internet phone and VoIP manufacturers as the standard for interoperability.

In a traditional network, groups of computers and other devices, such as printers, were configured as a Local Area Network (LAN). Each of these devices is generally referred to as an end node device. Hubs, bridges or switches are used in the same physical segment or segments connecting all end node devices. End node devices can communicate with other end node devices on the same LAN without the need for a router.

Communications with end node devices on other LAN segments requires the use of a router or gateway (collectively "router"). Specifically, each LAN is separated from another LAN by a router. As networks expand, more routers are needed to separate users into LANs and provide connectivity to other LANs. One drawback to this design is that routers add latency, which essentially delays the transmission of data. Another disadvantage of a LAN is that LANs are often setup based on location and geographic constraints. For example, in an office building, all the computers and printers on one floor may be members of one LAN while computers and printers on the second floor may be members of another LAN. However, in actual use, it may be advantageous to connect computers from the first floor with those from the second floor. Thus, it would be more convenient to be able to put all of the end node computers that need to talk to each other on the same LAN.

In an attempt to overcome the physical limitations of LANs, Virtual LANs (VLAN) were developed. For large numbers of VoIP devices, a VLAN is typically used. A VLAN can be viewed as a group of devices on different physical LAN segments which can communicate with each other as if they were all on the same physical LAN segment. VLANs provide a number of benefits over a LANs. Using VLANs, it is possible to group computing devices logically into a single broadcast domain. This allows us to define broadcast traffic for this VLAN to just those devices that need to see it and reduce traffic to the rest of the network. Also, with VLANs connection speeds increase due to the elimination of latency from router connections. An additional benefit is increased security since access from foreign networks, i.e. those that originate from another subnet beyond the router, is not allowed.

In order to implement VLANS, IEEE has propagated Standard 802.1Q which defines the requirements for a VLAN network. Additionally, in order to add a priority to data packets flowing through the network, IEEE has propagated Standard 802.1D to specify a 3-bit priority code, which can be encoded into the Ethernet header of the data packet. The three-bit priority code represents numbers 0 through 7, thus creating 8 choices or 8 different priorities. In a VLAN network implementing IEEE Standards 802.1Q/D, a VLAN having packets of different priorities is enabled.

A disadvantage of the present VoIP devices is that the priority is assigned to a default value of 6, regardless of the type of call being processed. There is currently no way to detect if one call is more important than another call. Thus an important call to an ambulance or fire department must contend with all other calls for network resources.

In summary, the prior art methods of routing emergency calls in a VoIP network do not provide flexibility and efficient use of network resources that is needed for today's networks. A system or method which overcomes these problems would have numerous advantages.

SUMMARY OF THE INVENTION

The present invention provides a means for improving emergency call service of a VoIP device in a VLAN environment. With the present invention, a specific range of ports is reserved for emergency calls. When a emergency call is placed, the VoIP device will recognize that the call is emergency-based on the port number and raise the priority of data packets associated with the call.

As such, according to one embodiment, disclosed is a method of improving emergency call service of a VoIP device in a VLAN. The method includes the step of a VoIP device reserving a range of ports for emergencies. Next, an emergency call is transmitted over the reserved ports and extra network resources are allocated to speed the call through the VLAN. Alternatively, the priority of data packets associated with the emergency call are increased in priority.

Also disclosed is a module for improving emergency call service of a VoIP device in a VLAN. The module is adapted for modifying the handling of emergency calls in a VoIP device. A VoIP device is adapted for reserving a range of ports for emergencies and for transmitting emergency calls over the reserved ports. Finally, the module is further adapted for reserving extra network resources to speed emergency calls through the VLAN.

Further disclosed is a program product for improving emergency call service of a VoIP device in a VLAN. The program product modifies the handling of emergency calls in a VoIP device. A VoIP device has a logic means for reserving a range of ports for emergencies. The program then uses a logic means for transmitting emergency calls over the reserved ports. Finally, the program uses a logic means for reserving extra network resources to speed emergency calls through the VLAN.

A technical advantage of the invention is the ability to optimize network resources so that emergency calls may be delivered as fast and promptly as possible in a VLAN environment.

Another technical advantage of the invention is the ability to improve safety since calls will be routed quickly in situations where every second counts.

BRIEF DESCRIPTION OF THE DRAWINGS

For a more complete understanding of the present invention including its features and advantages, reference is made to the following detailed description of the invention, taken in conjunction with accompanying drawings of which.

Corresponding numerals and symbols in the figures refer to corresponding parts in the detailed description, unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of the specific ways to make and use the invention, and do not delimit the scope of the invention.

Figure 1:
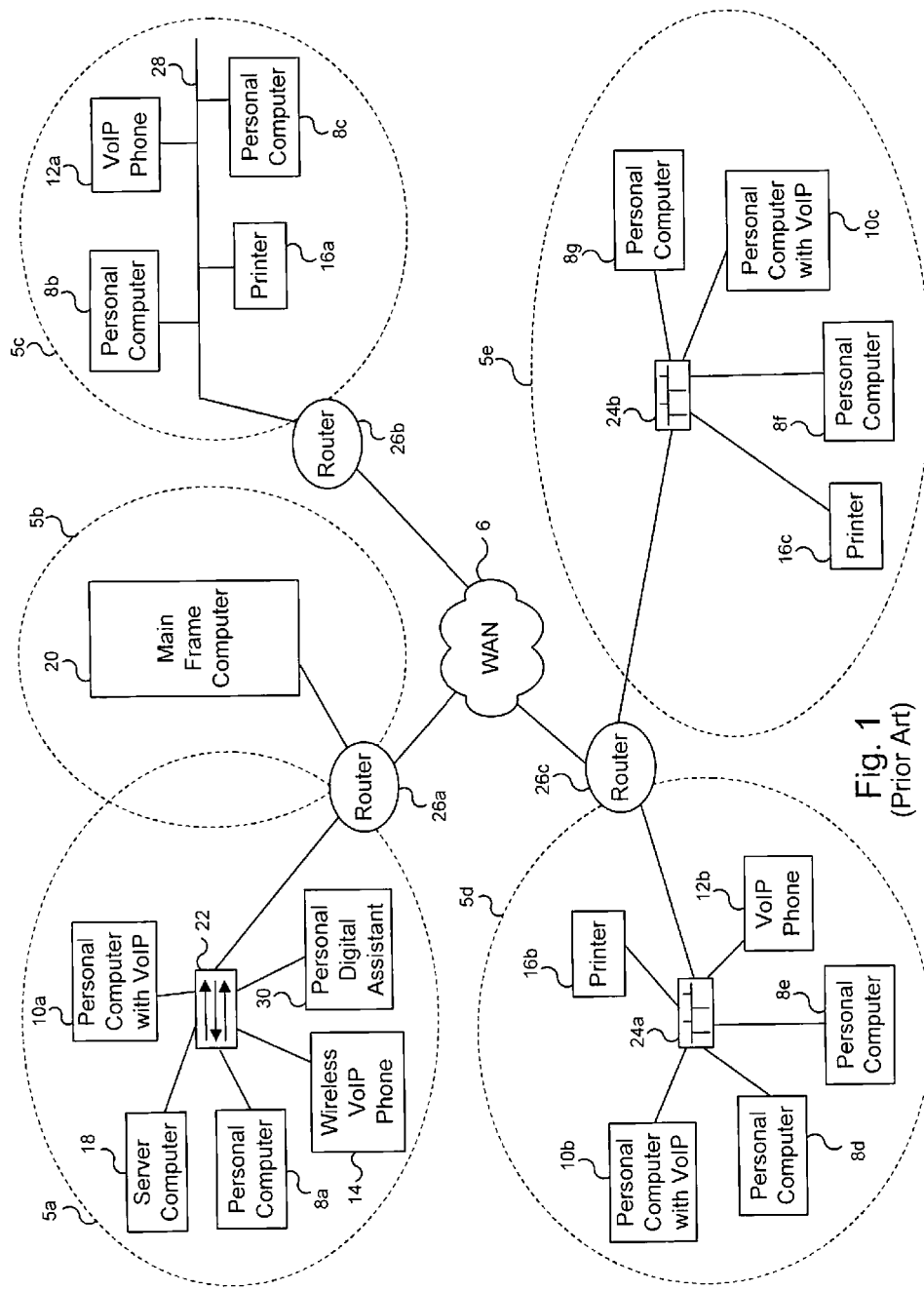
FIG. 1 depicts a network in which the LAN architecture of the prior art is shown.

To better understand the invention, reference is made to FIG. 1, wherein a diagram of a communications network 4 in which a traditional LAN implementation is shown. A LAN is generally defined as a broadcast domain. Hubs, bridges or switches in the same physical segment or LAN connect all end node devices in the LAN. End nodes in a LAN can communicate with each other without the need for a router. Typically, end node devices are personal computers, server computers, main frame computers, printers and other devices which may be connected to the network. Communications with devices on other LAN segments requires the use of a router.

As can be seen in FIG. 1, several LANs 5A–5E are connected to Wide Area Network (WAN) 6. Each LAN 5A–5E is connected to a router 26A–26C to join WAN 6. LAN 5A comprises several end nodes: a personal computer 8A, a server computer 18, a wireless voice over internet protocol (VoIP) phone 14, a personal digital assistant 30, and a personal computer with VoIP access 10A. Each of these end nodes are connected through switch 22 to router 26A to access other computers across WAN 6. LAN 5B comprises main frame computer 20, which is connected to WAN 6 through router 26A. Another LAN 5C is a thin Ethernet wire 28 connecting personal computer 8B, VoIP phone 12A, personal computer 8C and printer 16A to router 26B to access WAN 6. Another LAN is shown as 5D. LAN 5D comprises a printer 16B, a personal computer with VoIP access 10B, personal computers 8D and 8E, and VoIP phone 12B. These end nodes are connected through hub 24A to router 26C to access other LANs across WAN 6. Finally, LAN 5E comprises printer 16C, personal computers 8F and 8G, and personal computer with VoIP access 10C connected through hub 24B to router 26C to access computers across WAN 6.

A disadvantage of network 4 is that each separate LAN 5A–5E must connect through a router 26A–26C for computers within one LAN section to talk with computers in another LAN section. Routers add latency, which essentially delays the transmission of data. This is caused by the process involved in routing data from one LAN to another LAN. The router must use more of the information in a data packet to determine destinations and route the data to the appropriate end node.

Another disadvantage is that LAN segments are typically divided by physical location. This means that computers that are near each other in a building will be connected on the same LAN segment; however, these computers may not need to communicate with each other at all. The majority of their communication may be with computers in other LAN segments. If inter-LAN communication is excessive, it can slow down the entire network since packets must travel through routers for each communication to be made.

Figure 2:
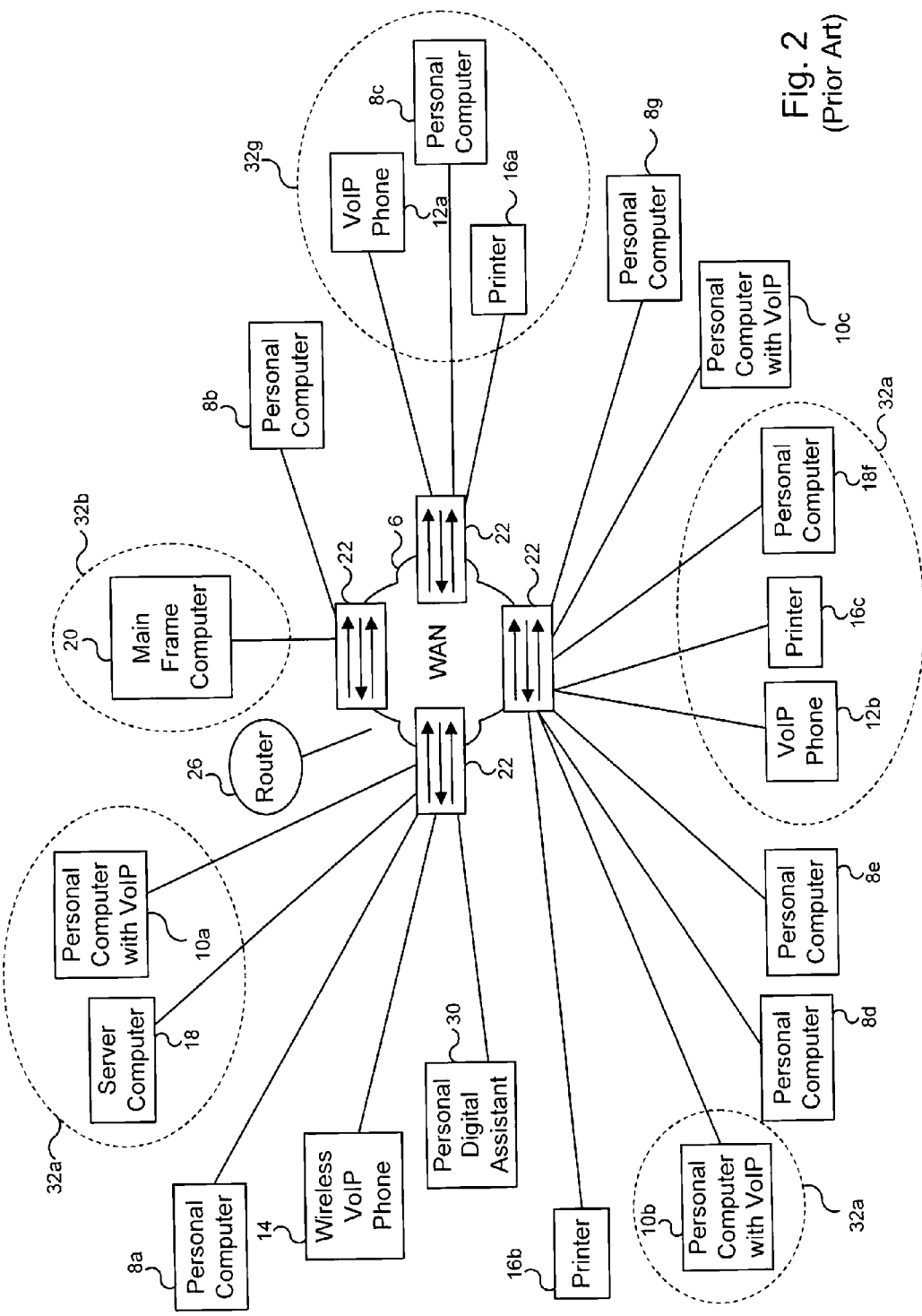
FIG. 2 depicts a network using a VLAN architecture of which an embodiment of the present invention may be implemented.

With reference to FIG. 2, therein is shown network 4 reconfigured as VLAN-capable. Each end node is now connected to a switch 22 to connect to WAN 6. For access outside of WAN 6, router 26 will be utilized. However, for communications that stay within the local WAN 6, only the switches 22 will be used. Virtual LANs can be viewed as a group of devices on different physical LAN segments which communicate with each other as if they were all in the same physical LAN segment. Thus, VLAN 32A comprises server computer 18, personal computer with VoIP access 10A, VoIP telephone 12B, printer 16C, personal computer 8F, and personal computer with VoIP access 10B. Connecting these end node devices through VLAN 32A, the end node devices act as if they are on a single LAN segment. VLAN 32B is also depicted. VLAN 32B consists of main frame computer 20, personal computer 8C, printer 16A and VoIP telephone 12A.

In FIG. 1, LANs 5A–5E were grouped with physical location being the primary concern. In FIG. 2, VLANs 32A and 32B have been built with traffic patterns in mind. All of the end node devices in VLANs 32A, 32B have been grouped primarily on traffic patterns. Using VLANs, end node devices in VLAN 32A are grouped together to confine broadcast traffic to just those end node devices that need to see it, and to reduce traffic to the rest of the network 4. There is an increased connection speed due to the elimination of latency from router connections. Those skilled in the art will recognize that any combination of end nodes and switches could be utilized for network 4 and a VLAN. The specific example in FIG. 2 is for illustrative purposes.

Figure 3:
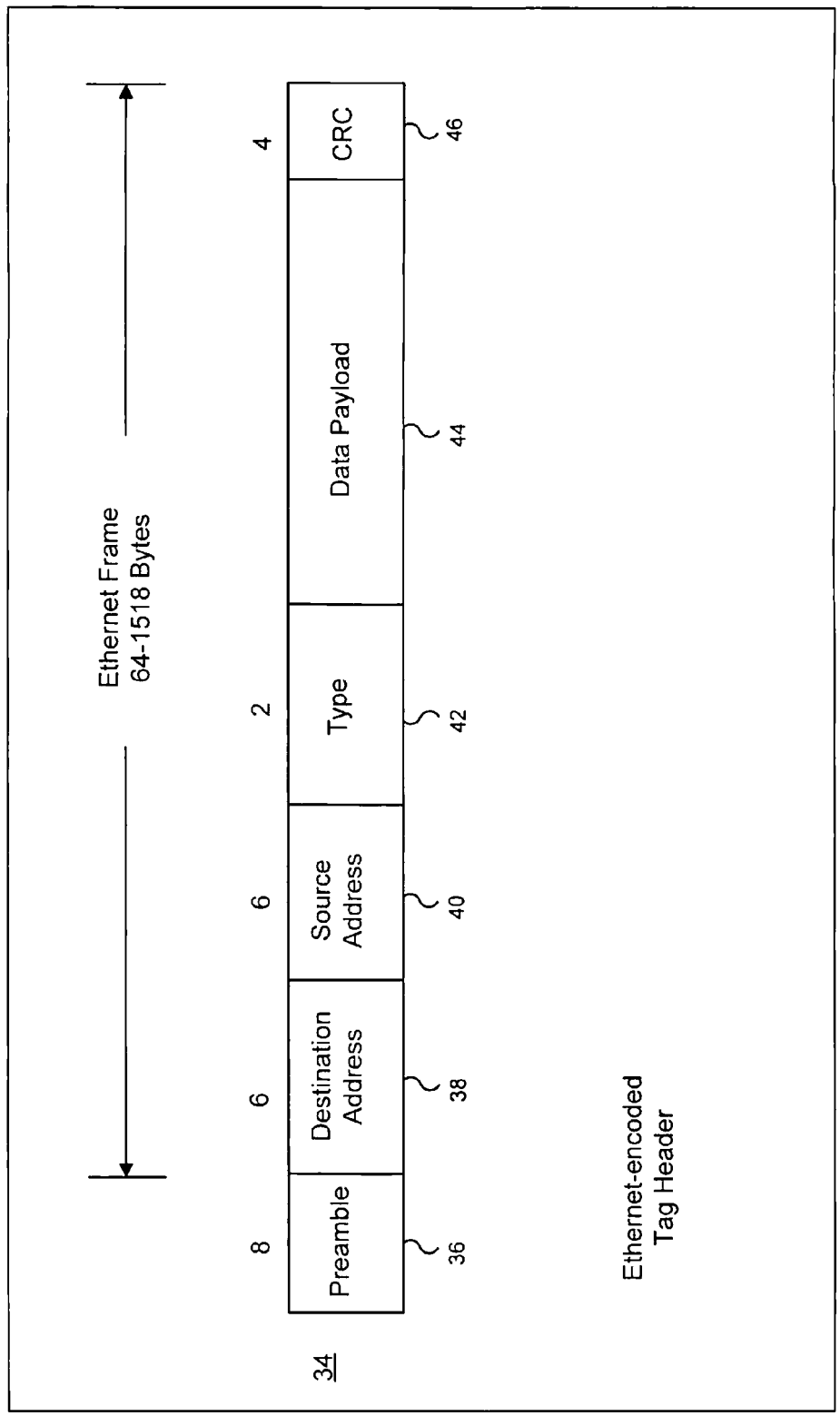
FIG. 3 depicts an Ethernet header, as described in the prior art.

In FIG. 3, a typical Ethernet header 34 is shown. An Ethernet header conforms to standards set up by IEEE Standard 802. Ethernet header 34 describes how information is packed into a data packet so that the information may be successfully deciphered. The first portion is called the preamble 36. Preamble 36 consists of 7 bytes of a synchronization pattern consisting of alternating 1s and 0s, which is used to ensure receiver synchronization. It also consists of one byte designated as the start frame delimiter. The start frame delimiter is similar to the other section of the preamble except that it ends with two consecutive bits set to one.

Next is the designation address 38. This is a 48-bit field which specifies to which station the packet is addressed. The first bit indicates the type of address: if it is a zero, the field gives the address of a unique station; if it is a one, the field specifies a larger group of recipients.

The next portion of the Ethernet header 34 is source address 40. Source address 40 is a unique address of the originating station as specified in this 48-bit field. Next comes the type 42. This two-byte field indicates the number of information bytes being supplied by the data field or the protocol type. Those skilled in the art will recognize that type 42 is sometimes referred to as length. Next is data payload 44. IEEE Standard 802 recommends that data payload 44 have a length between 46 and 1500 bytes. The 46-byte minimum ensures that valid packets will be distinguishable from collision fragments. If the data supplied is less than the 46-byte minimum required for proper information of the Ethernet protocol, then an integer number of padding bytes are added to the end of the data field to bring the length to 46 bytes.

The last field is the Cyclic Redundancy Check (CRC) 46 field. This field is also referred to as the frame check sequence. CRC 46 contains a 32-bit cyclic redundancy check code for error detection, as defined by the generating polynomial G(x). CRC 46 covers the destination address, source address, and data fields. CRC 46 algorithm uses a linear feedback register which is initially preset to all ones. After the last bit is transmitted, the contents of this register are inverted and sent as the CRC 46 field.

Figure 4:
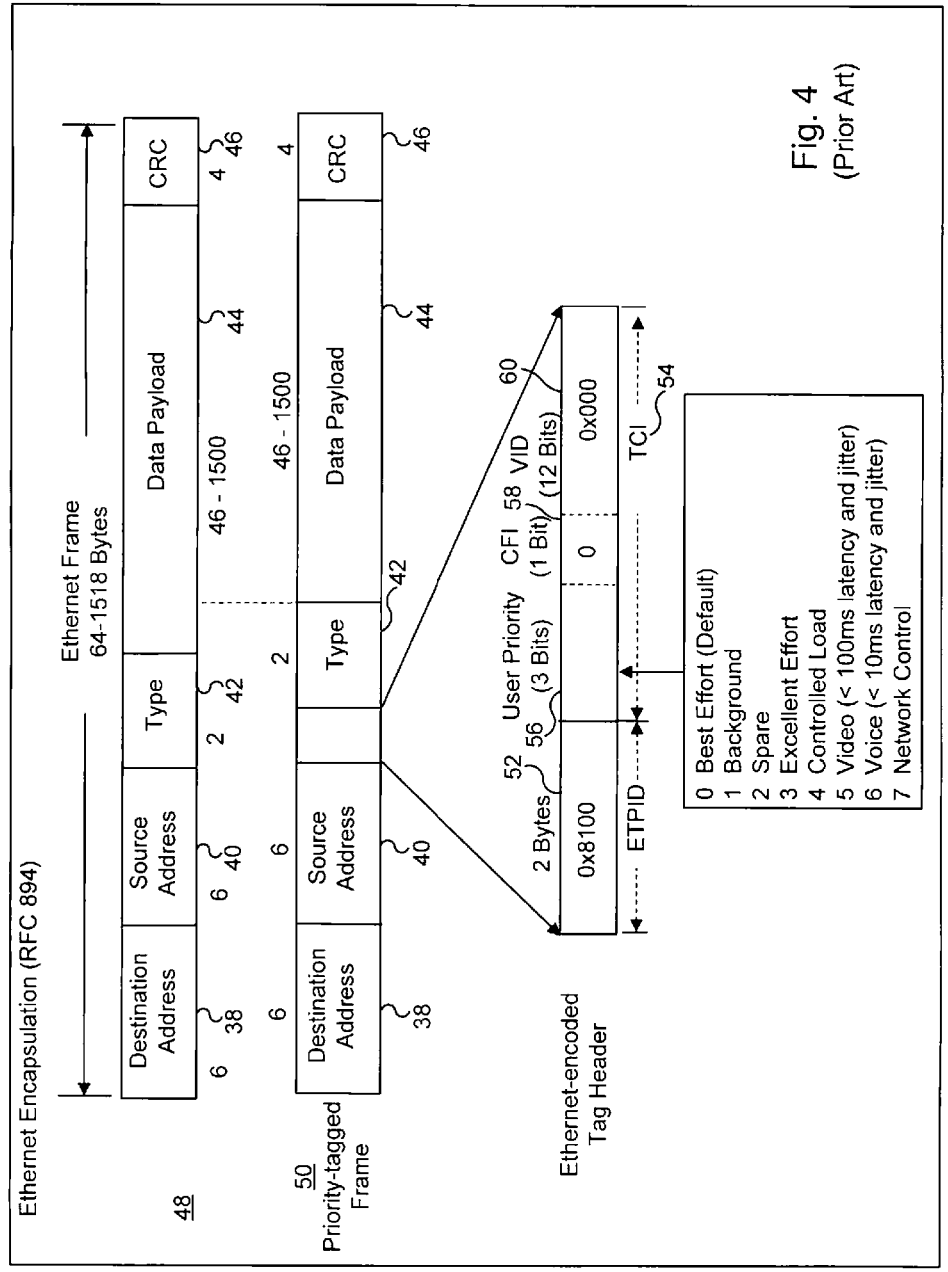
FIG. 4 depicts an Ethernet frame and a prior art priority tagged Ethernet frame, as is described in the prior art.

An Ethernet frame is defined as all the sections of an Ethernet header except for the preamble 36. In FIG. 4, Ethernet frame 48 is depicted. Ethernet frame 48 includes destination address 38, source address 40, type 42, data payload 44 and CRC 46. In priority tagged frame 50, priority and VLAN identifier data are added. Priority tagged frame 50 comprises destination address 38, source address 40, Ethernet Tag Protocol Identifier (ETPID) 52, Tag Control Information (TCI) 54, type 42, data payload 44, and CRC 46. ETPID 52 is used to identify the proper protocol and implement it. In this example, it is a value of 0x8100.

The Tag Control Information 54 is comprised of three separate pieces of information. First is the priority 56. Priority 56 is made up of a three-bit designation. Since three bits will allow eight different values, eight different priorities are available. They are represented by priorities 0 through 7. The eight different priority fields 56 are as follows: 0, best effort; 1, background; 2, spare; 3, excellent effort; 4, controlled load; 5, video; 6, voice; and 7, network control.

Next, if Canonical Format Indicator (CFI) 58 is set, the E-RIF field is present and the bit determines whether mac address information carried by the frame is in canonical or non-canonical format. If CFI 58 is not set, it indicates that the E-RIF field is not present and that all mac information carried by the frame is in canonical format. Finally, the VLAN Identifier (VID) 60 is used to uniquely identify the VLAN to which the frame belongs. A null value indicates that the tag header contains only user priority information and no VLAN ID.

Figure 5:
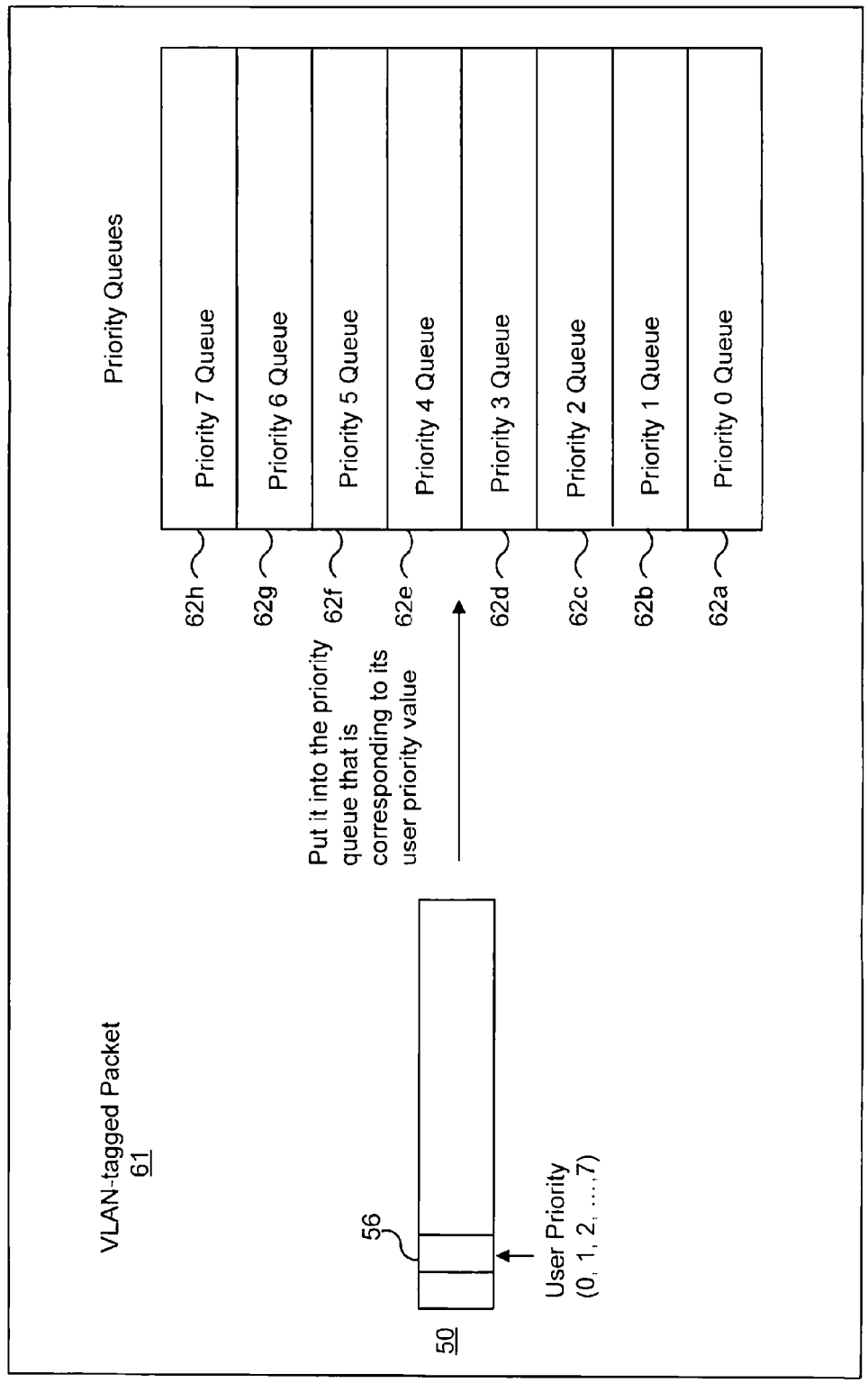
FIG. 5 depicts a VLAN-tagged packet with a priority code being used to decide what priority queue data packets should go into, according to the prior art.

Referring to FIG. 5, data packet 61 is shown with a VLAN tag frame 50. Data packet 61 has a priority 56 which determines which of the 8 priority queues 62A–62H data packet 61 will be put into as it traverses network 4. According to IEEE Standard 802.1Q/D, the priority value is set in the packet and may not be changed; thus, whatever priority value the packet has when it begins its journey, it will be placed in that priority queue in all VLAN-compatible queues along the route.

Figure 6:
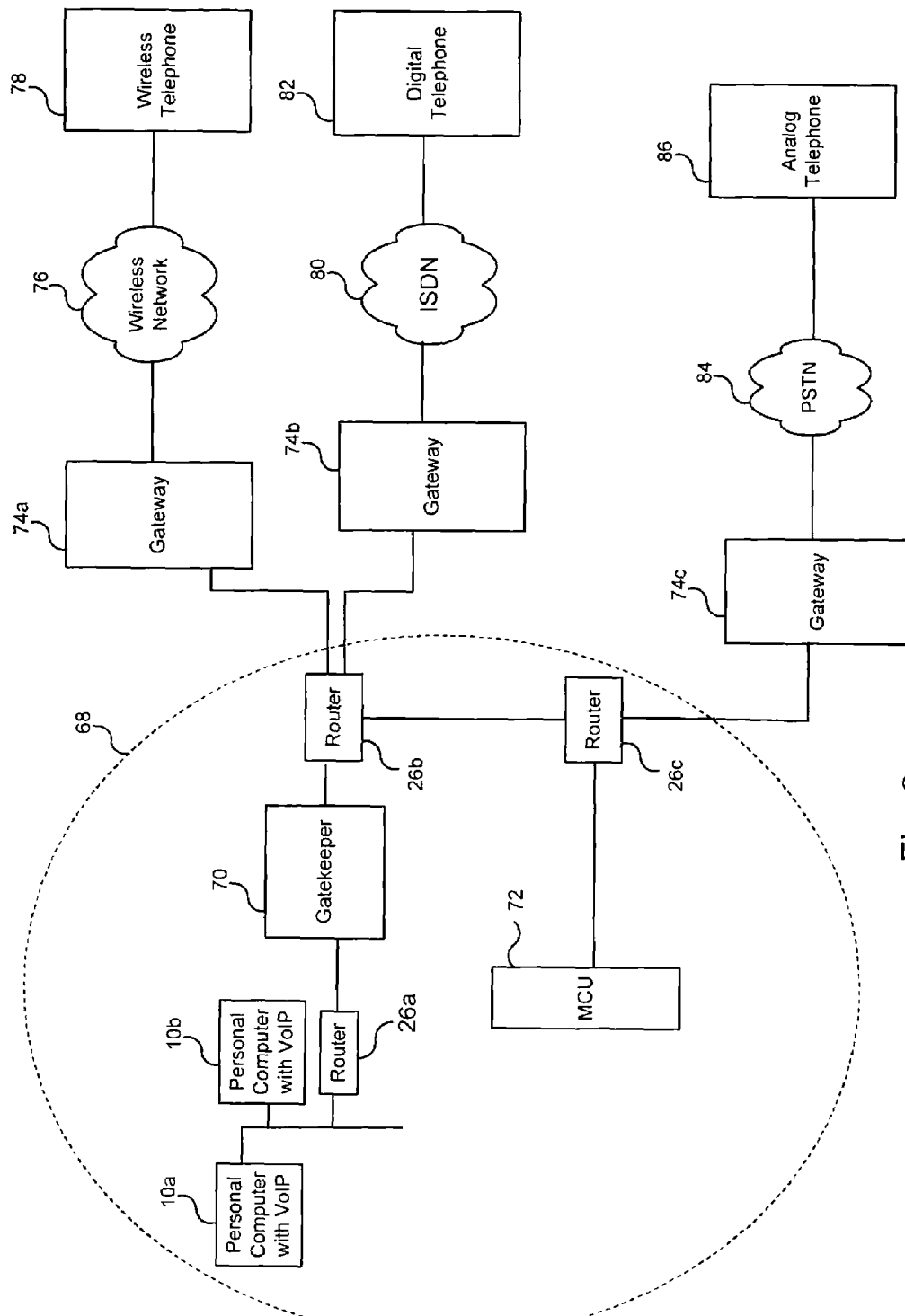
FIG. 6 is a VoIP network in which the present invention may be practiced.

FIG. 6 illustrates a network in which an embodiment of the invention may be practiced. Personal computers with VoIP access 10A and 10B are connected to router 26A. Router 26A is connected to gatekeeper 70 and then connected to router 26B. A Multi-point Control Unit (MCU) 72 is connected to router 26C. Routers 26B and 26C are connected to each other and connect to traditional telephone networks. Router 26B is connected to gateway 74A, which provides access to wireless network 76 so that a wireless telephone 78 may be accessed. Gateway 74B provides access from the VoIP network 68 to an Integrated Services Digital Network (ISDN) 80 so that digital telephone 82 may be accessed. Router 26C provides access to gateway 74C, which is connected to the Public Switch Telephone Network (PSTN) 84 to access to analog telephone 86.

Although there are many different types of VoIP access, the preferred implementation uses H.323 standards. H.323 defines four major components: terminals, gateways 74, gatekeepers 70 and multi-point control units 72. Terminals are the client end points on the network that provide Real-Time, two-way communications. All H.323 terminals must support voice communications; video and data support are optional under H.323. H.323 terminals are represented by personal computers with VoIP access 10A and 10B.

Gateway 74 is an optional element under H.323 that provides many services, the most common being a translation function between H.323 conferencing end points and other terminal types. This function includes translation between transmission formats and communication procedures. In addition, gateway 74 also translates between both audio and video codecs and performs call setup and clearing on both the VLAN side and the switch circuit network side. Codec stands for Compression and Decompression Code. A codec defines a protocol to allow data to be compressed and decompressed for transmission in a network. In general, the purpose of gateway 74 is to reflect the characteristics of a VLAN end point, such as personal computer with VoIP access 10A, to a switched circuit network end point, analog telephone 86 for example, and vice versa.

The primary application of gateways 74 are likely to be: establishing links with an analog PSTN terminal; establishing links with remote H.320 compliant terminals over ISDN-based switch circuit networks and establishing links with remote H.324 compliant terminals over PSTN networks. Gateways 74 are not required if connections to other networks are not needed since the end point may directly communicate with other end points on the same VLAN. Terminals communicate with gateways 74 using H.245 and Q.931 protocols.

A gatekeeper 70 is an important component of an H.323 enabled network. It acts as the central point for all calls within its zone and provides call control services to registered end points. In many ways, an H.323 gatekeeper acts as a virtual switch. Gatekeepers 70 perform two important call control functions. The first is address translation from VLAN aliases for terminals and gateways 74 to IP or IPX addresses, as defined in the RAS specification. The second function is bandwidth management, which is also designated within RAS. For instance, if a network manager has specified a threshold for the number of simultaneous conferences on the VLAN, the gatekeeper 70 can refuse to make any more connections once the threshold is reached. The effect is to limit the total conferencing bandwidth to some fraction of the total available. The remaining capacity is left for e-mail, file transfers, and other VLAN protocols. The collection of all terminals, gateways 74 and MCUs 72 managed by a single gatekeeper 70 is known as an H.323 zone. Another valuable feature of the gatekeeper 70 is its ability to route H.323 calls. By routing the call through a gatekeeper 70, calls can be controlled more effectively. Service providers need this ability in order to bill for calls placed through the network. This service can also be used to re-route a call from another end point if a called end point is unavailable.

The MCU 72 supports conferences between three or more end points. Under H.323, an MCU 72 consists of a Multi-point Controller (MC), which is required in Multi-point Processors (MP). The MC handles H.245 negotiations between all terminals to determine common capabilities for audio and video processing. The MC also controls conference resources by determining which, if any, of the audio and video streams will be multi-cast.

Figure 7:
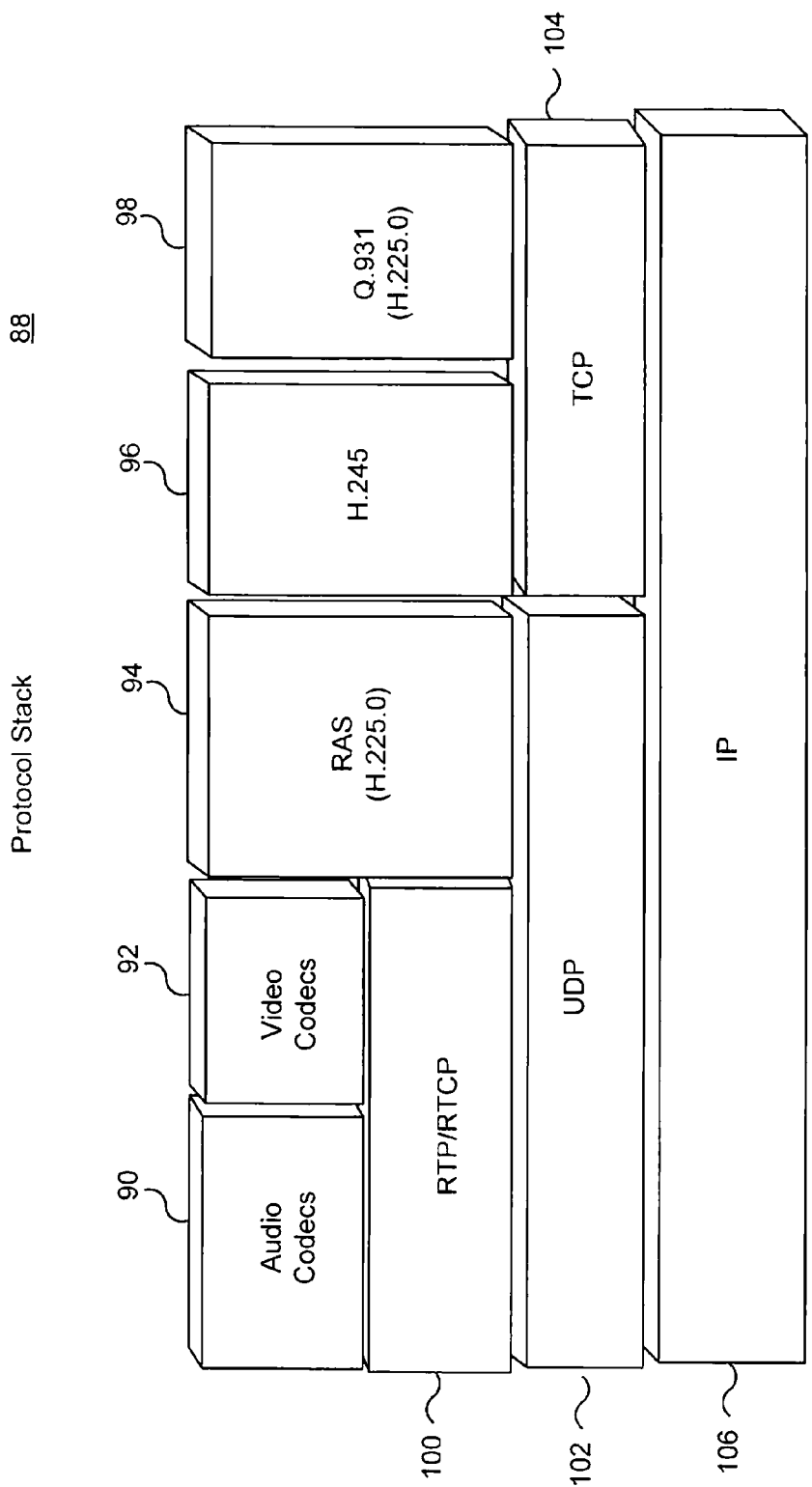
FIG. 7 illustrates an H.323 protocol stack for allowing VoIP calls to be placed over an IP network, as utilized by the invention.

In FIG. 7, the protocol stack 88 required by H.323 is shown. Audio codec 90 is a code used to specify compression of the audio data. Those skilled in the art will recognize that G.723 and G.729 are often the preferred audio codecs. Video codec 92 is used under H.323 to decompress and compress video information. As can be seen, audio codec 90 and video codec 92 are carried over the Real-Time Protocol (RTP) 100 layer. Those skilled in art recognize that media is carried over UDP layer 102 since this is the more unreliable layer. The media contained in audio codec 90 and video codec 92 is carried over UDP 102 because it would not make sense for it to be retransmitted if a media packet is lost. Should a lost sound fragment be retransmitted, it would most probably arrive too late to be of any use in voice reconstruction. The Q.931 signaling information 98 and H.245 96 capability exchange are carried on the TCP layer 104 so that control packets can be retransmitted, if necessary, to ensure that control instructions arrive at the destination. All the information is then transferred on the IP layer 106, as is familiar to those skilled in the art.

Figure 8:
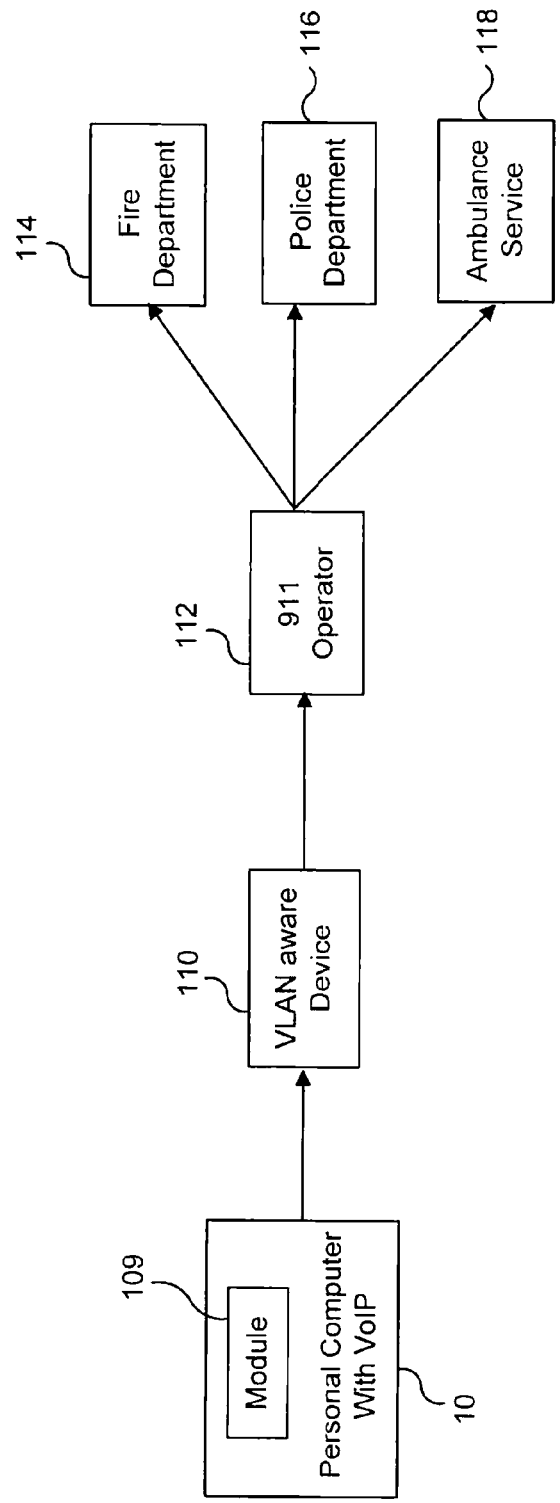
FIG. 8 depicts the use of a module according to one embodiment of the invention.

In FIG. 8, a VLAN using an embodiment of a module is shown. Personal computer with VoIP access 10 has a module 109 which allows emergency calls to be sent over a reserved range of ports. The preferred range for these ports are numbers greater than 20,000. When the module 109 transmits a call on one of these ports, the priority of the data packets is increased. In the preferred embodiment, the priority of the data packets associated with the call are raised a priority value of seven (7) to allow for a maximum number of extra resources to be allocated for handling the call. VLAN aware device 110 recognizes that this is an emergency call based on the port number and speeds the call along the network. A Webswitch by Ericsson is an example of a VLAN aware device that could be used for handling the call. The call then reaches 911 operator 112 to be routed to the appropriates emergency services. Those skilled in the art will recognize that 911 operator 112 could also be a traditional telephone operator, or other persons or machines capable of getting the necessary response to the emergency call. 911 operator 112 dispatches the fire department 114, the police department 116, or ambulance service 118 as needed for a specific emergency. Those skilled in the art will appreciate that other services known to those skilled in the art, such as hazard material cleanup may be dispatched as an emergency call. In alternative embodiments is possible to route the call directly to the desired services without going through 911 operator 112.

Figure 9:
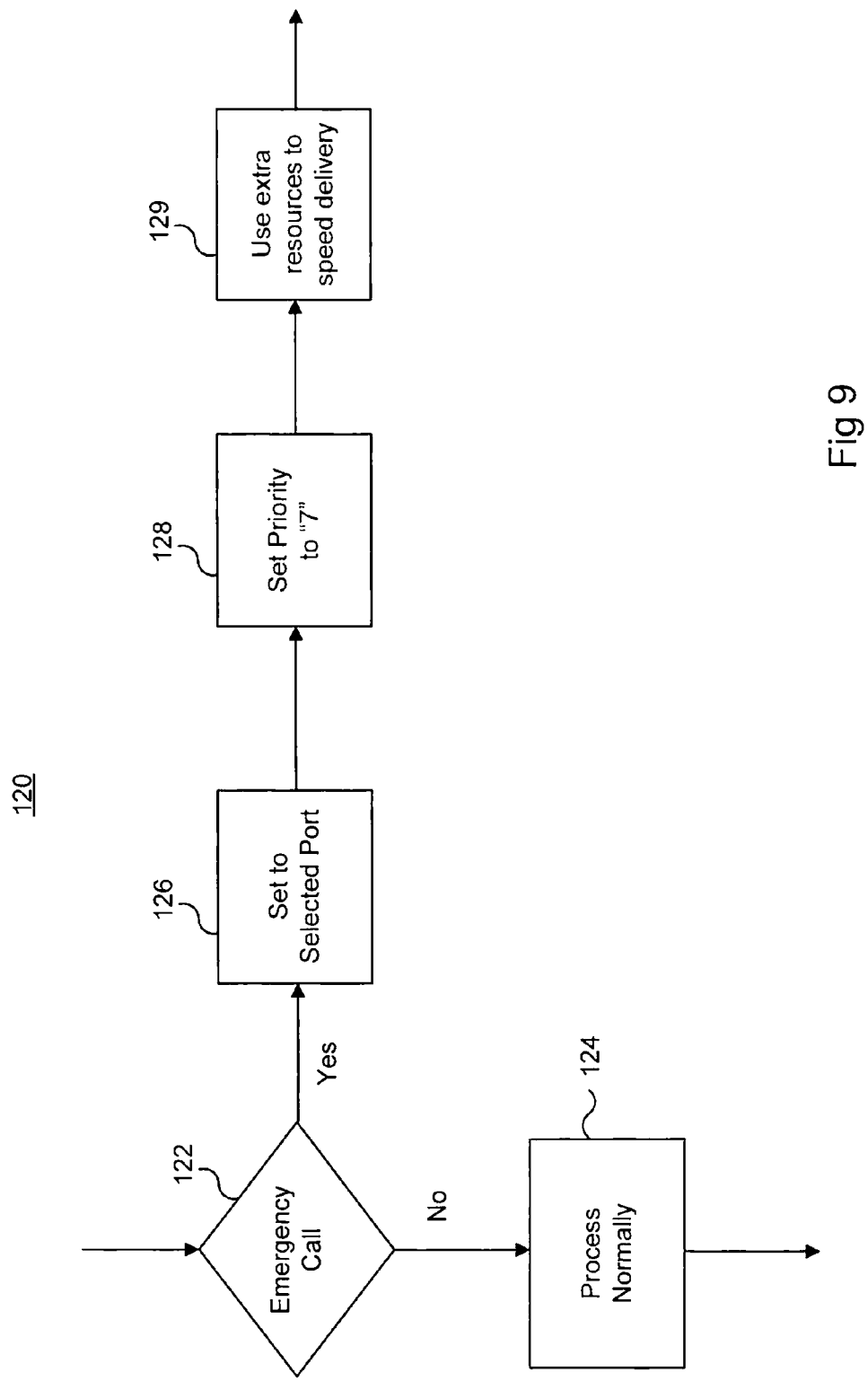
FIG. 9 depicts a flow diagram for program product, according to an embodiment of the present invention.

FIG. 9 illustrates a high-level logic flow diagram 120 illustrating process steps for implementing the method and system of the present invention, in accordance with a preferred embodiment of the present invention. It can be appreciated by those skilled in the art that FIG. 9, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a VLAN-aware device, instructions implementing these method steps. Such instructions can be maintained within other computer memory locations. Implementation of the method described herein is left to the discretion of a particular VLAN-aware device designer.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 9. While the present invention is described in the context of a fully functional communications network 4, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method of FIG. 9 as described herein as a program product residing in a memory of microcomputer. Alternatively, a preferred embodiment of the present invention can include a program product residing in a microcomputer memory located at an VLAN-aware device such as switch 22. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a VLAN-aware device by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

In FIG. 9 is shown a diagram of an embodiment of the program product 120. Program product 120 first has a logic means for reserving a range of specific ports for use during emergencies. Next, it has a logic means for transmitting an emergency call within the VLAN using ports in the specified range 126. Next, a logic means for increasing the priority value of the call 128 sets the priority of each data packet associated with the emergency call to seven (7). Finally, a logic means for reserving extra resources 129 applies extra resources to the call so the call moves through the VLAN as fast as possible.

In alternative embodiments the program product also comprises logic means for transmitting the call to a 911 operator, a fire department, a police department, an ambulance service or others known to those skilled in the art.

Figure 10:
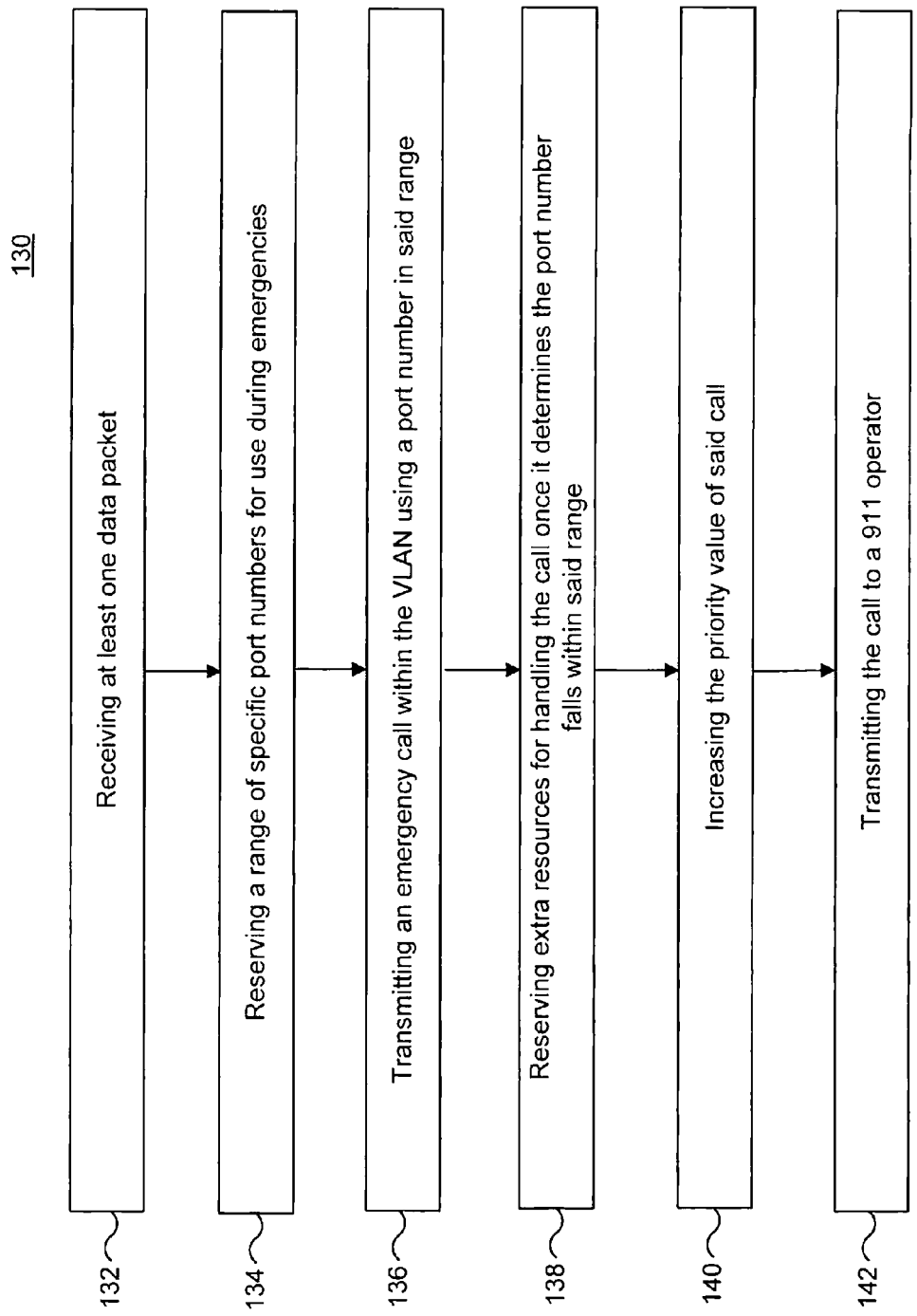
FIG. 10 is a flow chart depicting a method, according to an embodiment of the present invention.

In FIG. 10, a logic flow diagram of method 130 is depicted. In step 132 at least one data packet is received for an emergency call. In step 134, a range of port numbers is reserved for use during emergencies. Next, in step 136 a VoIP device transmits an emergency call within the VLAN using a port in the specified range. In step 138 extra resources are reserved for handling the calls using ports within the specified range. Next, in step 140 the priority value of the call is increased. Finally, in step 142 the call is transmitted to a 911 operator.

In alternative embodiments of the invention, the call is transmitted to a fire department, police department, or ambulance service. Those skilled in the art will recognize that the invention is not limited to notifying only the listed emergency services but may be used to notify any appropriate service. The preferred increase in priority is to move the data packets associate with the call to a priority value of seven (7).

What is claimed is:

1. In a virtual local area network (VLAN), a method of handling emergency voice over Internet protocol (VoIP) calls comprising the steps of:
    reserving a range of specific port numbers for use during emergencies;
    detecting a call within the VLAN having a port number falling within said range of specific port numbers:
    classifying the call as an emergency call;
    reserving extra resources for handling the emergency call:
    determining an actual priority value of the call; and
    routing the emergency call packets to a queue requiring a higher priority than the actual priority value of the emergency call.

2. The method of claim 1 wherein said step of reserving a range of specific port numbers further comprises
    reserving a specific range of port numbers so that when a port number within the range of specific port numbers is detected, the priority value of the call is raised.

3. The method of claim 1 wherein said step of reserving a range of specific port numbers further includes the step of increasing the priority value of said call to seven.

4. The method of claim 1 wherein the step of reserving extra resources is followed by the step of transmitting the call to a 911 operator.

5. The method of claim 1 wherein the step of reserving extra resources is followed by the step of transmitting the call to a fire department.

6. The method of claim 1 wherein the step of reserving extra resources is followed by the step of transmitting the call to an ambulance.

7. The method of claim 1 wherein the step of reserving extra resources is followed by the step of transmitting the call to a police department.

8. In a virtual local area network (VLAN), a module for managing emergency voice over internet protocol (VoIP) calls, comprising:
    means for reserving a range of specific port numbers for use during emergencies;
    means for detecting a call within the VLAN having a port number falling within said range of specific port numbers;
    means for classifying the call as an emergency call;
    means for determining an actual priority value of the call; and means for routing the emergency call packets to a queue requiring a higher priority than the actual priority value of the emergency call.

9. The module of claim 8 wherein said means for reserving a range of specific port numbers further comprises means for reserving a range of specific port numbers so that when a port number within the range of specific port numbers is detected, the priority value of the call is raised.

10. The module of claim 8 wherein said means for reserving a range of specific port numbers further comprises means for increasing the priority value of said call to seven.

11. The module of claim 8 further comprising means for transmitting the call to a 911 operator.

12. The module of claim 8 further comprising means for transmitting the call to a fire department.

13. The module of claim 8 further comprising means for transmitting the call to an ambulance dispatcher.

14. The module of claim 8 further comprising means for transmitting the call to a police department.

* * * * *